United States Patent [19]

Varaprasad et al.

[11] Patent Number: 5,049,338
[45] Date of Patent: Sep. 17, 1991

[54] METHOD OF PROMOTING SOL GEL SILICEOUS-CONTAINING REACTIONS

[75] Inventors: Desaraju V. Varaprasad, Holland, Mich.; Agaram S. Abhiraman, Stone Mountain, Ga.; Ernest L. Lawton, Allison Park, Pa.

[73] Assignee: PPG Industries, Inc., Pittsburgh, Pa.

[21] Appl. No.: 370,210

[22] Filed: Jun. 22, 1989

Related U.S. Application Data

[63] Continuation-in-part of Ser. No. 293,404, Jan. 4, 1989, abandoned.

[51] Int. Cl.$^5$ ............................................. D01F 6/96
[52] U.S. Cl. .................................. 264/183; 264/184; 264/209.1; 264/209.6; 264/211; 264/211.11; 264/211.15; 264/211.16; 264/211.18; 264/211.19
[58] Field of Search ................... 264/211.11, 184, 211, 264/29.2, 56, 203, 210.6, 210.8, 211.16, 211.15, 211.19, 233, 183, 209.1, 209.6, 211.18; 501/95

[56] References Cited

U.S. PATENT DOCUMENTS 4,396,587 8/1983 Yamaguchi et al. ............... 423/406

Primary Examiner—Hubert C. Lorin
Attorney, Agent, or Firm—Kenneth J. Stachel

[57] ABSTRACT

A sol gel reaction process for forming glassy articles involves the hydrolysis of silicon alkoxides with or without additional dispersions of hydrated silicon oxides, and polymerization including crosslinking. The present process involves forming glassy articles by the sol gel reaction route utilizes coagulation promoters having fatty acid hydrophobic moieties and hydrophilic moieties of primary, secondary, tertiary amines or quaternary ammonium compounds. The coagulation promoter catalyzes either and/or both of the hydrolysis and polymerization reactions. The coagulation promoter can be the only catalyst in forming the sol or can be used in addition to acid or basic catalyst. Additionally or alternatively, the coagulation promoter is added to a coagulation fluid to which shaped hydrolyzate is added. Afterwards the gelled shape precursor is optionally consolidated to form a precursor glass shape and optionally is consolidated to form the glassy shapes of films, coatings, beads, fibers, tubes and monolithic structures.

14 Claims, 1 Drawing Sheet

METHOD OF PROMOTING SOL GEL SILICEOUS-CONTAINING REACTIONS

This application is a continuation-in-part of application Ser. No. 07/293,404, filed Jan. 4, 1989, now abandoned.

The present invention is directed to a method of promoting the hydrolysis and/or gelation (condensation reaction) of hydrolyzable siliceous-containing compounds that when hydrolyzed, are capable of condensing.

The sol-gel reaction of hydrolyzing siliceous-containing compounds and condensing these hydrolyzed species involves acid or basic or neutral hydrolysis with simultaneous and/or subsequent condensation which may also be catalyzed. Recently research interest and effort have focused on the sol-gel reaction to produce silica-containing forms or shapes and/or metal oxide-containing forms or shapes having amorphous or crystalline characteristics or precursor shapes of these which, through drying and consolidation, form the desired shapes. Generally, the term "sol" is used interchangeably with the term "solution". The possibility of producing glassy materials at lower temperatures than those necessary for producing glass by melting sand and other materials is the pot of gold at the end of the sol gel rainbow.

Catalysis for the hydrolysis reaction occurs from protons of the acids such as hydrochloric, acidic and the like for acid hydrolysis and from hydroxyl ions such as those from ammonium hydroxide, sodium hydroxide and the like for basic hydrolysis. Also, at a neutral pH catalysts such as dibutyltindiacetate promote the hydrolysis reaction. In addition to catalyzing the hydrolysis reaction, some of the same catalysts also promote the gelation or condensation reaction. For example, basic materials like sodium hydroxide, ammonium hydroxide, ammonia and also the dibutyltindiacetate assist in the gelation reaction. It has also been reported that the pH of a sol solution can be raised from around about 1 to 2 to about 3 to 6 by the addition of a base. Such useful bases include: gaseous, ammonia and organic bases such as triethylamine, pyridiene, aniline; and the like and aqueous solutions of any of the aforementioned bases, and bases including metal ions such as sodium hydroxide, potassium hydroxide and the like as shown in U.S. Pat. No. 4,680,045.

We have discovered a catalyst with utility in either or both the hydrolysis and condensation reactions.

SUMMARY OF THE INVENTION

The present invention is a process for producing at least one, and usually a plurality, of siliceous-containing amorphous shapes through a sol-gel reaction process. The invention involves forming at least one shape from at least one type of metal alkoxide including silicon alkoxide through at least partial hydrolyzation of the alkoxide compounds in the presence of an effective catalytic amount of at least one cationic surfactant. The cationic surfactant is a surface active, organic compound having both hydrophobic/lipophilic and hydrophilic/lipophobic moieties having primary, secondary, tertiary amines and quaternary ammonium groups, (hereinafter referred to as "cationic surfactant"). A catalytic amount of the cationic surfactant can be present in either the hydrolysis reaction and/or the gelation (condensation) reaction of the sol gel reaction process. The shapes formed from the sol gel process can vary from films or coatings to fibers, beads, tubes and bulk or monolithic glass. The cationic surfactant can be used alone or in addition with a inorganic or organic base to increase the pH during the gelation or coagulation.

DETAILED DESCRIPTION OF THE INVENTION

Figure 1:
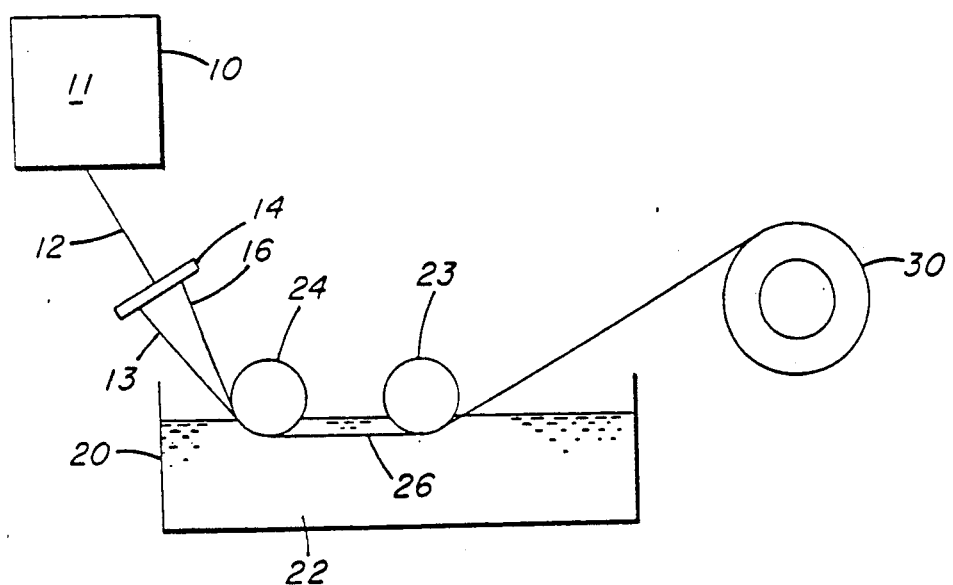
FIG. 1 is a schematic representation of forming fibrous shapes by a dry jet wet spinning sol gel process.

In the sol-gel process for producing glass articles, a liquid or alcoholic solution of a metal alkoxide is subjected to hydrolysis, polymerization or gelation. The metal alkoxide has a general formula $X(OR)_n$, where the "X" indicates a metal and the "R" indicates an alkyl group. The hydrolysis and polymerization reactions result in an article that is a precursor glass which must be consolidated through dehydration to produce a nonporous silica-article. In producing films coatings, fibers and tubes, the hydrolysis and polymerization reactions result in siloxane linkages and depending on the ratio of metal alkoxide to water, the resultant polymer can be essentially linear or can have extensive crosslinking. The term "essentially linear" refers to the polymer chains being linear for the most part with only minor amounts of branching or budding in the chain, and where branching or budding occurs, the branched or budded chains are relatively short. The general hydrolysis reaction of the metal alkoxide is:

$$X(OR)_n + nH_2O = X(OH)_n + nROH \qquad (1)$$

The polymerization or gelation reaction involves:

$$X(OH)_n = XO_{n/2} + (n/2)H_2O \qquad (2)$$

Some polymerization occurs with already hydrolyzed species during the occurrence of hydrolysis of other species, so the reactions are usually not neatly segregated. Hydrolyzation and polymerization reactions occur sequentially to the extent that the product of the first reaction (hydrolysis) is needed as a reactant in the second reaction (polymerization).

Preparation of the sol or hydrolyzate occurs from the addition of water, a catalyst such as an acid like hydrochloric acid or a base to a metal alkoxide including some silicon alkoxide in the presence or absence of a solvent. Also, the preparation of a sol can include using more than 1 preparatory solution. A first preparatory solution can be a metal alkoxide hydrolyzed with an acid catalyst, and the second preparatory solution can be a metal alkoxide hydrolyzed with a basic catalyst. Adjustment of the pH of the two solutions as necessary results in the ability to combine the solutions to give a required sol.

The metal alkoxide reactant in the sol gel process is chiefly a silicon alkoxide, but other metallic type compounds can be present. The silicon alkoxide has a general formula similar to the aforedescribed formula for metal alkoxide where X=Si to give $Si(OR)_4$. Nonexclusive examples of silicon alkoxides include: silicon methoxide, silicon ethoxide, silicon propoxide, and the like compounds well known to those skilled in the art. An alternative reference for these compounds is alkyl silicates including: methyl silicate, ethyl silicate and propyl silicate. In addition to the metal alkoxide or in lieu thereof, colloidal dispersions of hydrous siliceous oxides also produce sols. Also present may be small amounts of silica that is, an ultrafine particle silica, such as that commercially available under the names CAB-0-SIL, Aerosil, Arch silica and the like.

A suitable solvent is employed generally for the hydrolysis reaction if a difficulty arises in obtaining a homogeneous solution of the silicon alkoxide and water. Generally, the amount of solvent used is that which is the minimum effective amount. Another role performed by the solvent is assisting in uniform gelation of the alkoxide solution by avoidance of excessive rapid reaction between the alkoxides and water. Any solvent known to those skilled in the art in the sol gel process may be utilized. A few particular nonexclusive examples of these include lower alcohols such as methanol, ethanol, propanol or butanol. The lowest generally effective amount of the solvent is a mole ratio of the solvent to the total alkoxide in the solution of about 3 to about 1. It is possible to use additional amounts of solvent, where amounts of the solvent can range up to about 10:1 in a mole ratio of solvent to total alkoxide.

The amount of water used to prepare the sol generally ranges from a mole ratio of water to total alkoxide in the solution of about 1:1 to about 20:1. This amount of water varies depending on the form of glass article produced from the sol gel process. For instance, in forming fibers a spinnable sol must be produced and the amount of water generally ranges from 1.5 to 1 mole ratio to less than around 4:1.

In acid catalyzed hydrolysis, the hydrolyzing solution has a pH of about 1 to about 2. When formation of the hydrolyzate with basic catalysis involves addition of a base to raise the pH, suitable bases include: inorganic metal hydroxides such as sodium and potassium hydroxide and also ammonium hydroxide and ammonia gas or aqueous ammonia and organic bases such as triethyl amine, pyrridine, aniline and their aqueous solutions and the like.

Examples of the aforementioned reactants and their amounts are given in the article entitled "Gel Method for Making Glass", Sumio Sakka, *Treatise on Material Science and Technology*, Volume 22, pages 129–167, Academic Press, Inc., 1982, and the article entitled "The Sol-Gel Transition in Hydrolysis of Metal Alkoxides in Relation to the Formation of Glass Fibers and Films", S. Sakka and K. Kamiya, *Journal of Non-Crystalline Solids*, 48(1982), pages 31–46, North Holland Publishing Co., 1982, both of which are hereby incorporated by reference.

Subsequent processing of the sol depends upon the form of glass article that will be produced. For instance, formation of fibers, tubes and beads involves forming the shape prior to the occurrence of a substantial amount of crosslinking. If formation of the shape requires a certain viscosity of the hydrolyzate, the hydrolyzate can be aged under appropriate conditions to produce the required viscosity. Also, if shape formation is not carried out shortly after the solution of the required viscosity is formed, the sol can be cooled to retard further polymerization reaction, and thus, maintain the viscosity for shape formation.

Promotion of additional polymerization may result from maintaining temperature conditions, removing alcohol to drive the polymerization reaction, providing for further hydrolysis, if necessary, by adding additional water, and/or utilizing additional gelation promoters or catalysts. For instance, in forming certain shapes of hydrolyzate such as fibers, tubes and beads, these shapes can be immersed in a coagulation bath where a cationic surfactant is present to promote the gelation or polymerization reaction.

The cationic surfactant useful in the present invention as a catalyst, hereinafter referred to as coagulation promoter, includes: aliphatic mono-, di- and polyamines and rosin-derived amines such as acetates, napthenates, oleates and the like, and generally any hydrocarbon-containing hydrophobe having amino nitrogen or quaternary nitrogens present as a hydrophilic moiety; amine oxides, alkyl- or alicyclic-amines, 1-(2-hydroxyethyl)-2 alkyl-2-imidazolines, N, N, N', N'-tetrakis-substituted ethylenediamine derivatives; amines with amide linkages prepared by the condensation of carboxylic acid with di-, or polyamines; and quaternary ammonium salt compounds; and amidated polyamines, polyaminoamides and fatty acid reaction products and partially amidated polyalkylene imines, the term "fatty acid" as used herein including the claims also includes mixtures of fatty acids.

Particularly useful coagulation promoters include the amidated polyamine fatty acid reaction product available from Emery Chemical Co. under the trade designation Emery 6760U which is a 50 percent active version of an internal/external lubricant in a mixture of acetic acid and water. Another suitable coagulation promoter is that available from Emery under the trade designation Emery 6717 which is a partially amidated polyalkyleneimine which is a viscous liquid having: a pour point of 55 at 25° C., a density in pounds per gallon of 8.3, a Gardner color of 10, a cloud point of less than 25° C., a flash point of 540° F. and which is soluble in water dispersible in mineral oil and insoluble in organic solvents such as butyl stearate and glycerol trioleate, stoddard solvent and xylene.

Sole use of the coagulation promoter involves amounts to about 3 percent by weight in an aqueous solution. In using the coagulation promoter as a catalyst in forming the hydrolyzate, use of any additional acid or basic catalyst is not necessary but may be employed. Additional acid catalysts may be used initially with the coagulation promoter in the hydrolysis and basic catalyst may be used subsequently to increase the pH up to as high as around 10 or more. Employment of the coagulation promoter in a coagulation bath after formation of the shape may allow for reduced amounts of acid or basic catalysts present in the sol. Amounts of the coagulation promoter used in coagulation baths range from about 0.05 up to around 3 weight percent of the total liquid in the coagulation bath. Higher amounts may be used with appropriate modifications in residence time or in processing speed through the bath.

Any method of forming the shapes of films, coatings, tubes, fibers, beads and the like known to those skilled in the art are employable with the coagulation promoter as a catalyst by the process of the present invention. In the formation of fibers, tubes and beads, the coagulation promoter may be added to the hydrolyzate and/or to any coagulation bath in a process of forming the shapes. Nonexclusive examples include: dry-jet, wet and dry-jet-wet spinning of fibers where the coagulation promoters are employed in the coagulation bath. In dry spinning of sol gel fibers, the cationic lubricant may be added to the hydrolyzate before spinning or production of the fibers.

FIG. 1 is a nonexclusive example of forming fibers by a dry jet wet spinning process where the coagulation promoter is in the coagulation bath. The wet spinning process differs from the dry jet wet spinning process of FIG. 1 merely by immersing the fiber forming head (spinnerette) into the coagulation bath and compensating with pumping pressures and the like to extrude the fibers into the coagulation bath.

In FIG. 1, the sol 11 is formulated or placed in device 10 for passage or conveyance to the spinnerette 14 through conduit 12. Alternatively, the spinnerette 14 can be located directly on device 10. In this case conduit 12 could be abrogated as long as the hydrolyzate is adequately mixed and has a spinnable viscosity when it contacts the spinnerette. The sol is produced to result in a viscosity for spinning of the fibers that is in the range of around 50 to 500 poise. Viscosities greater than 500 poise can also be used, but such initial high viscosities may limit the spinnability of the fibers. The sol is preferably produced in a manner to limit exposure to atmospheric moisture, although the sol can develop increased viscosity with exposure to the atmosphere if properly controlled.

When the sol is aged to a spinnable viscosity, the sol is passed to the spinnerette 14 having one or more holes for the production of one or more fibers. Any spinnerette known to those skilled in the art of preparing fibers can be used. The passage of the sol is effected by any method known to those skilled in the art to allow for a spinnable viscosity of around 80 to preferably around 500 or more poise in the spinnerette. For example, pressure to move the sol can be developed from the use of one or more pumps, or the use of gaseous pressure or mechanical charging devices. The fiber or fibers pass from the spinnerette 14 to liquid nonsolvent 22 that is contained in bath 20 and that acts as the coagulation bath with the presence of the coagulation promoter. At least one and preferably a plurality of fibers 16 and 18 are contacted for immersion into the liquid nonsolvent by rollers 24 and 28. The fiber or fibers hereinafter referred to by the term "fibers," which includes both the singular and plural, denoted in FIG. 1 by numeral 26 are preferably kept separated in the nonsolvent liquid. Fibers 26 are removed from the bath by winder 30. Preferably upon removal from the bath, the fibers have at 30 the fibers have a continuous length. To start the fibers from the spinnerette through the bath and onto the winder, a lead is merely pulled through the bath and placed on the winder.

As shown in FIG. 1, the fibers produced by the dry jet wet spinning or the wet spinning process contact the liquid nonsolvent. The type of liquid nonsolvent and duration of contacting and the temperature of the liquid nonsolvent during contacting provides for furtherance of gelation or coagulation to produce cohesive fibers and preferably fibers that have at least surfaces that are essentially nonsticky. The development of effective coagulation may occur by one or more routes including additional polymerization, additional hydrolyzation and polymerization and/or removal of organic solvent. Preferably, the fibers are essentially devoid of organic polymeric material. The viscosity of the spinning fluid along with the effective coagulation maintains the integrity of the fibers. The integrity of the fibers refers to a minimum amount of spreading of the liquid fiber in the nonsolvent liquid bath. An aqueous alkaline solution for the nonsolvent liquid is preferably a diluted ammonium hydroxide solution with a pH from 9 to 10, but can be an aqueous alkaline solution of other types of water soluble inorganic or organic bases producing an equivalent pH. The nitrogen-containing coagulation promoters useful in an aqueous solution as the nonsolvent liquid include: long carbon chain alkyl amines, alkyl amides, polyalkyleneimides, amidated polyamines, polyamino amides, oxylated amines, alkyltrialkyl quaternary ammonium salts, alkyl imidazoline derivatives, fatty amides including primary and/or secondary, amides ethylene bisamides and alkanol-amides all having alkyl moieties having from 5 to 30 carbon atoms. In addition, other types of nitrogen-containing coagulation promoters can be used such as partially amidated polyalkylenimines such as those shown in U.S. Pat. No. 3,597,265 (Mecklenborg et al) hereby incorporated by reference. A particularly useful nitrogen-containing coagulation promoter is pelargonic tetraalkylene pentamine derivatives, some of which may have the functional groups exemplified by the formula:

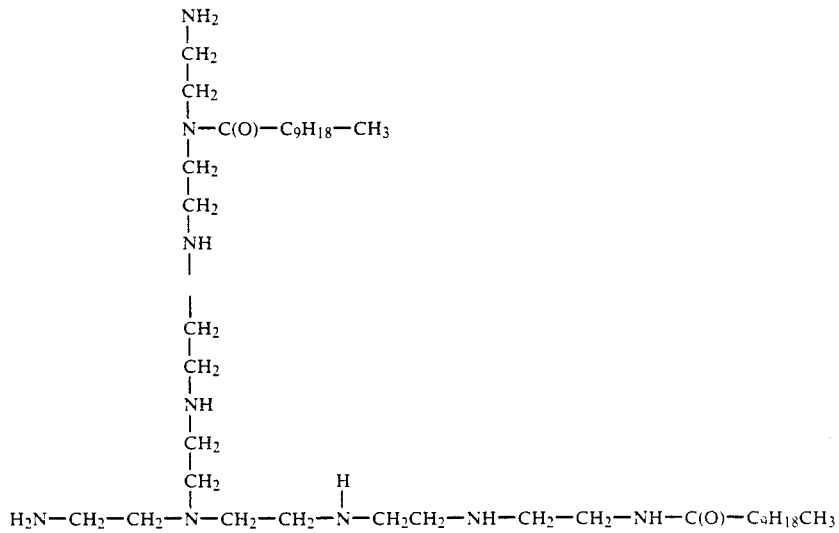

surfaces that are substantially nontacky. Such fibers can be combined to form at least one strand, i.e., a plurality of fibers before winding. Through the process from formation of the fibers at the spinnerette 14 to winding Such a material is commercially available as Emery 6760U. The concentration of the nitrogen-containing coagulation promoter in the nonsolvent liquid ranges from about 0.05 to around 3 weight percent of the liquid nonsolvent. The temperature of the nonsolvent liquid generally ranges from above freezing to less than the boiling point and more particularly ranges from room or ambient temperature to around 80° C. and preferably around 70° C. The residence time of the fibers in the liquid nonsolvent is an effective time to allow for development of cohesive or integral fibers and preferably predominantly nonsticky fibers. In addition, organic solvents can be used as a liquid nonsolvent, but it is preferred to use an aqueous solution to allow for additional hydrolysis of the silicon alkoxides in the fibers. Generally, the residence time of the fibers in the liquid nonsolvent ranges from around 0.01 to 1 minute, since the fibers can be pulled through the liquid nonsolvent at speeds up to around 80 feet or more, even up to around 150 feet per minute.

In addition to the aforementioned reactants present in formation of the hydrolyzate, thickening agents and flexibilizing compounds are optionally useful. Examples of flexibilizing agents would be polyoxyethylene polymers and copolymers and thickening agents include such materials as water-soluble cellulose ether.

After formation of any of the shapes, drying of the shapes occur by any method known to those skilled in the art. Also, subsequent consolidation of the shapes to glassy articles can occur by any method known to those skilled in the art.

In the aforementioned disclosure, all of the stated ranges are generally specified since they cannot be specified with particularity to cover all of the individual sol compositions and processing steps contemplated by the present invention because of the differences in the molecular weight of the sols and between wet processing and dry jet wet processing. The specific variables can individually influence the specific value within the stated ranges. For the values within the stated ranges there are many sol compositions and processing steps that will result in fiber formation.

PREFERRED EMBODIMENT

The best mode of the invention for the production of the sol gel siliceous-containing fibers is by wet coagulation in either the wet or dry-jet wet spinning process. Silicon ethoxide is dissolved in a minimal amount of ethyl alcohol so that the volume ratio of ethyl alcohol to tetraethyl orthosilicate is in the range of around 0.3 to 0.8. Water is combined with the tetraethyl orthosilicate in an amount to give a ratio of concentrations of water to tetraethyl orthosilicate in the range of around 1.5 to 1.8. The effective catalytic amount of the acid which is preferably hydrochloric acid is in the range of around 0.01 to about 0.05 moles per mole of tetraethyl orthosilicate. The initial reaction is conducted at a temperature in the range of around room temperature to around 90° C. for a period of time between less than one hour to around 20 hours. Use of higher temperatures allows use of lower reaction times and lower temperatures utilize longer reaction times. After the initial reaction is conducted for the specified period of time, the sol is aged at a temperature in the range of around room temperature to around 90° C. for around 1 to around 100 hours.

The aged sol is processed in accordance with a process like that depicted in FIG. 1, where the multifilament spinnerette is immersed in the nonsolvent liquid, and the process has a subsequent second treatment bath. The coagulation promoter present in the nonsolvent liquid bath is an aqueous solution of the acidified amidated polyamine Emery 6760U available from Emery Chemical Company, Cincinnati, Ohio in an amount in the range of around 0.2 to 0.5 weight percent. Also, the nonsolvent liquid has a pH adjusted with ammonium hydroxide in the range of around 9 to 10 and is also at a temperature in the range of 10 to 60° C. The speed of traverse of the fibers through the nonsolvent liquid is in the range of around 10 to 150 feet per minute. The fibers are removed from the nonsolvent liquid and preferably sprayed with water to assist in washing the fibers before they are treated with the second liquid.

The second liquid treatment occurs in a bath similar to that with the nonsolvent liquid. The fibers are removed from the nonsolvent liquid and immersed in the second liquid bath. The second liquid is at an elevated temperature in the range of around 60 to 65° C. to assist in stretching of the fibers. The second liquid is an aqueous solution of ammonium hydroxide where the ammonium hydroxide is present in an amount up to around 0.5 weight percent. If stretching is imparted to the fibers in the second liquid, the second liquid will contain little or no ammonium hydroxide. The fibers are traversed through the second liquid at a speed in the range of around 10 to 600 feet per minute. For stretching the speed through the second bath is faster than the speed through the nonsolvent liquid or the removal speed from the second bath is faster than the entry speed of the second treatment bath. The fibers are removed from the second liquid treatment and passed through a tube dryer to assist in drying the fibers, and the fibers are wrapped in a package of superimposed annular layers of continuous fiber on a winder.

In the aforementioned disclosure for the preferred embodiment, all of the stated ranges are generally specified since they cannot be specified with particularity to cover all of the individual sol compositions and processing steps contemplated by the present invention because of the variation in the molecular weight of the sols and the difference between wet processing and dry jet wet processing. The specific variables may individually effect the specific value within the stated ranges. For the values within the stated ranges there are many sol compositions and processing steps that will result in fiber formation.

The invention will be further illustrated by referring to the following nonlimiting examples.

EXAMPLE 1

About 10 grams of the amidated polyamine available under the trade designation 6760-U from Emery Chemical Co. were dissolved in about 4 liters of water, and the solution was maintained at 47° C. in a water bath. The spinning solution was prepared from water, TEOS, hydrochloric acid, ethyl alcohol in amounts to give an initial molar ratio of water to TEOS of 1.6, a molar ratio of hydrochloric acid to TEOS of 0.021 and a volume ratio of ethyl alcohol to TEOS of 0.5. The reactants were aged for 70 hours at 70° C. The concentration of the Emery 6760-U material in the nonsolvent liquid bath was 0.25 percent. The sol (as a spinnable solution) has a viscosity of 260 poise, and it was placed in the L-shaped spinning unit to which was attached a single hole spinnerette, where the diameter of the hole was 0.15 mm. At 25 psi pressure of nitrogen, the solution extruded in the form of a fine filament through the hole in the spinnerette. The spinnerette was kept at a height of about 2 inches above the nonsolvent liquid bath (dry jet wet spinning). The extruded fiber was guided through the bath and onto the godet. Fiber was continuously spun and wound on the godet at a rate of 23 feet per minute. The fiber exhibited no stickiness, and it could be unwound from the package. The fiber was lusterous and transparent.

EXAMPLE 2

A similar sol as used in Example 1 was produced to have a viscosity of 260 poise. This sol was placed in a small straight tube spinning unit fitted with a spinnerette having 3 holes. The spinnerette was clamped at about 2 inches above the level of nonsolvent liquid in the coagulating bath. The bath liquid was the same as that used in Example 1. Under a nitrogen pressure of about 35 psi the solution extruded in the form of fine filaments where any difficulty in starting the filaments was solved by wiping the spinnerette with ethanol. The filaments were extruded into the spinning bath and collected on a rotating godet. The fibers were not sticking to each other and could be separated easily from one another where the spinning was carried out at a speed of 20 feet per minute.

EXAMPLE 3

A sol was prepared from water, TEOS, hydrochloric acid and ethyl alcohol in amounts to give ratios of concentrations of 1.6 for water to TEOS, 0.021 for HCl to TEOS, and 0.5 volume ratio for ethyl alcohol to TEOS. The reaction was conducted in a 1 liter flask and the TEOS and ethyl alcohol were heated to about 50° C. and the water and hydrochloric acid were added dropwise whereupon the solution boiled. The reaction was carried out for 30 minutes and the flask was covered and placed in the oven at a temperature of 65 to 70° C. After 2 hours the solution was poured into a wide crystallization dish and placed in the oven having a humid atmosphere. After about 22 hours of aging at around 70° C. the solution was fairly viscous, and it was transferred to a bottle and aged in an oven having a humid atmosphere for around 4 more hours to give a total of 25 hours. On standing overnight at room temperature the viscosity increased to 385 poise with a total aging time of 31 hours. The sol was placed in a pressurized container attached to a spinnerette having 80 holes with a hole diameter of 0.15 mm. With an applied nitrogen pressure of 25 psi the sol was extruded directly into a nonsolvent liquid. The nonsolvent liquid was prepared by placing approximately 25 grams of the Emery 6760-U material in 8 liters of water which was at room temperature of around 21° C. The multifilament yarn was guided through the nonsolvent liquid bath and out of the bath onto a first godet which was rotating at approximately 5 feet per minute. At this first godet the fibers were sprayed with water. From this first godet the filaments were guided through a second liquid bath of hot distilled water maintained at a temperature in the range of 65 to 68° C. The fibers were pulled through the second liquid bath at a speed of 25 to 30 feet per minute to stretch or draw the fibers. The fibers could be drawn to 5 or 6 times their original length. The wet fibers were wound onto bobbins and the fibers were flexible and not brittle, but upon drying at room temperature became opaque and somewhat brittle. Some of the fibers were subsequently treated in a dilute acid solution of 0.1 normal HCl. The fibers retained their shape, and the fibers had somewhat improved strength. Additional fibers were treated in a dilute solution of ammonia hydroxide while others were treated in a dilute solution of sodium hydroxide. The first basic solution was 1 ml of ammonium hydroxide per 50 ml of water, and the second basic solution was 0.2 grams of sodium hydroxide per 100 ml of water. The fibers were soaked in the acid or basic solutions overnight at room temperature and the fibers became resistant to ethyl alcohol and acetone.

EXAMPLE 4

Fibers produced in a similar manner to that of Example 3 were also spun in a similar manner into a nonsolvent liquid coagulant bath which was a more concentrated coagulating bath having 0.43 weight percent of Emery 6760U in water. These fibers appeared to have better strength and were not as brittle, and the yarn was resistant to ethyl alcohol and acetone even before a hydrochloric acid or ammonium hydroxide treatment.

EXAMPLE 5

Spinnable solutions similar to those of Example 1-3 were made having 1.7 equivalents of water and also containing 2 percent polyethyleneoxide (PEO) having 100,000 number average molecular weight. This solution was prepared from 300 milliliters of TEOS and 100 milliliters of absolute ethanol that was heated to 60° C. in a 1-liter beaker. A solution comprised of 50 milliliters of ethanol, 28.4 milliliters of one molar hydrochloric acid, 12.9 milliliters of water and 5.6 grams of PEO was added dropwise in about 15 minutes. This solution was aged in a humid atmosphere at 70° C. for about 50 to 55 hours. The viscosity of this solution increased to 270 poise. This solution was hazy but spinnable. Below 24° C. precipitation of PEO from solution occurred.

A coagulation bath containing about 0.6 percent of Emery 6760U catalyst was prepared. Filaments were extruded through a two-hole spinnerette and passed through the coagulation bath and wound at take-up speeds up to 22 feet per minute. The resulting filaments were sticky and fused together but such stickiness of the fibers was probably caused by the presence of 2 percent PEO which is soluble in water.

EXAMPLE 6

In dry jet wet spinning, similar to that discussed in Example 1, some ratios of TEOS to water could produce filaments which are sticky and fuse together. This is solved by increasing the distance between the spinnerette face and the coagulation bath, for instance, from 2 inches to around 8 inches. Also, the pH of the coagulation bath having the Emery 6760U polyamide material in an amount of around 0.6 percent is increased by the addition of a base such as concentrated ammonium hydroxide to produce an alkaline pH. Under alkaline conditions the polycondensation of the silanol groups occurs rapidly and thus, the rate of gelation is increased. Also, the temperature of the bath can be increased, although in this example it was maintained at 30° C. With the ammonium hydroxide in the coagulation bath, the spinnerette distance from the bath was 2 inches. The fibers formed into the bath and extruded through the bath did not stick to the guide and were passed through the bath. Fiber wound on a godet was not sticky but filaments still fuse together. The temperature of the bath was increased to 50° C. to increase the rate of gelation to obtain nonsticky fibers. The coagulated fiber was wound continuously on the godet. After drying at room temperature, the fiber could be unwound easily, and this fiber was bright and shiny.

EXAMPLE 7

A sol was prepared from a 500 ml of TEOS and 250 ml of ethyl alcohol placed in a crystallization dish which had added to it 47.1 ml of one molar hydrochloric acid along with 17.5 ml of water. This addition was completed in about 10 minutes and the crystallization dish was covered and placed in an oven having a temperature of 65 to 70° C. The dish was maintained in the oven in that condition for 1 hour, after which the cover was removed to expose the sol to the humid atmosphere of the oven. After about 26 hours of aging the surface of the sol appeared to have dried, and a film was formed. The sol was transferred to an 8 ounce bottle and placed in the oven for 2½ hours more. The room temperature viscosity of the solution increased to greater than 1000 poise, but the solution was still homogeneous. An amount of 15 ml of ethyl alcohol was added, and the solution was mixed well with a spindle and the viscosity decreased to 190 poise. The solution was again placed in the oven for 1½ hours and cooled to room temperature at which time the viscosity was approximately 390 poise and the solution was stored in the freezer. The solution was removed from the freezer after being there overnight and was used to wet spin fibers where the viscosity of the solution was about 400 poise at the time it was transferred to the spinning unit. The spinning was carried out similar to that of Example 3 where the initial speed through the coagulation bath was 5 feet per minute. The fibers in the drawing bath, which was distilled water at a temperature of 60° C. without the presence of any catalyst, could not be drawn by more than two times. Lusterous fibers were obtained from the drawing bath after heating in the tube heater.

We claim:

1. Process of producing at least one siliceous-containing amorphous shape from a sol-gel process, comprising: forming at least one shape from metallic type compounds selected from the group consisting of: silicon alkoxide, dispersion of hydrated siliceous oxides, and mixtures thereof by at least partial hydrolysis in the presence of an organic solvent and water to result in a shapable ungelled polymerizate, where in forming an effective catalytic amount of at least one coagulation promoter is present to catalyze the hydrolysis and polymerization in the coagulation process, and wherein the coagulation promoter is selected from the group consisting of: aliphatic mono-, di-, and polyamines and rosin-derived amines; and reaction products of fatty acids and hydrophilic moieties selected from the group consisting of amino nitrogen moieties, quaternary nitrogen moieties; and amine oxides, polyoxyethylene alkyl-alicyclic-amines, 1-(2-hydroxyethyl)-2 alkyl-2-imidazolines, N,N,N',N'-tetrakis-substituted ethylenediamine derivatives; amines with amide linkages prepared by the condensation of carboxylic acids with a di-, or polyamine; partially amidated polyalkylenimines and acidic solutions thereof; and long chain alkyl amines, long chain alkyl amides, amidated alkyl amines, polyamino alkyl amides, partially amidated polyalkylene amides.

2. Process of claim 1, wherein the shapes are selected from the group consisting of films, coatings, fibers, tubes and monolithic structures.

3. Process of claim 1, wherein the coagulation promoter is used with a base to increase the pH of the hydrolyzate up to around 10.

4. Process of claim 1, wherein the coagulation promoter is present in an amount up to 3 mole percent of the total alkoxides present in the hydrolyzate.

5. Process of claim 1, which includes furthering coagulation of the shape by placing the shapes in a coagulation solution wherein the coagulation promoter is present in an amount of 0.05 to 1 weight percent of a coagulation solution.

6. Process of claim 1, wherein the organic solvent is an alkyl alcohol where the alkyl group has one to five carbon atoms.

7. Process of producing at least one siliceous-containing amorphous shape from a sol-gel process, comprising:
   a. forming at least a partial hydrolyzate of compounds selected from the group consisting of silicon alkoxide, colloidal dispersions of hydrous siliceous oxides and mixtures thereof by acid catalyzed hydrolysis in the presence of an organic solvent at a temperature in the range of around ambient to elevated temperatures less than 100° C. and with a molar ratio of water to silicon alkoxide in the range of around 1 to 1 up to 4 to 1 so that ungelled polymerization results in a shape-formable viscosity in the range of around 50 to greater than 1000 poise,
   b. forming the shape from the hydrolyzate,
   c. contacting at least one shape with a nonsolvent liquid having a coagulation promoter for effective coagulation to produce at least a sticky shape,
   d. removing the shape from the nonsolvent liquid.

8. Process of producing at least one siliceous-containing amorphous shape from a sol-gel process, comprising:
   a. forming at least a partial hydrolyzate of compounds selected from the group consisting of silicon alkoxide, colloidal dispersions of hydrous siliceous oxides and mixtures thereof by acid catalyzed hydrolysis in the presence of an organic solvent at a temperature in the range of around ambient to elevated temperatures less than 100° C. and with a ratio of water to silicon alkoxide in the range of around 1 to 1 up to 4 to 1 so that ungelled polymerization results in a shape-formable viscosity in the range of around 50 to greater than 1000 poise, and
   b. forming the shape from the hydrolyzate in the presence of a coagulation promoter.

9. Process of claim 8, wherein the organic solvent is alkyl alcohol where the alkyl group has one to five carbon atoms.

10. Process of claim 8, wherein the organic solvent is ethyl alcohol in an effective solvent amount.

11. Process of claim 8, wherein the acid is hydrochloric acid in an effective catalytic amount.

12. Process of claim 8, wherein the shape is a fiber formed by dry jet spinning where the ratio of water to silicon alkoxide is in the range of 1.5 to 1 to around and including 4 to 1 so that ungelled polymerization results in a spinnable viscosity in the range of around 60 to greater than 1000 poise as measured at room temperature and the amount of the coagulation promoter is in the range of 0.2 to 1 weight percent.

13. Process of claim 8, wherein the coagulation promoter is selected from the group consisting of aliphatic mono-, di-, and polyamines and rosin-derived amines; and reaction products of fatty acids and hydrophilic moieties selected from the group consisting of amino nitrogen moieties, quaternary nitrogen moieties; and amine oxides, polyoxyethylene alkyl-alicyclic-amines, 1-(2-hydroxyethyl)-2 alkyl-2-imidazolines, N,N,N',N'-tetrakis-substituted ethylenediamine derivatives; amines with amide linkages prepared by the condensation of carboxylic acids with a di-, or polyamine; partially amidated polyalkylenimines and acidic solutions thereof; long chain alkyl amines, long chain alkyl amides, amidated alkyl amines, polyamino alkyl amides, partially amidated polyalkylene amides and partially amidated polyalkylene imines.

14. Process of claim 7, wherein the coagulation promoter is selected from the group consisting of aliphatic mono-, di-, and polyamines and rosin-derived amines; and reaction products of fatty acids and hydrophilic moieties selected from the group consisting of amino nitrogen moieties, quaternary nitrogen moieties; and amine oxides, polyoxyethylene alkyl-alicyclic-amines, 1-(2-hydroxyethyl)-2 alkyl-2-imidazolines, N,N,N',N'-tetrakis-substituted ethylenediamine derivatives; amines with amide linkages prepared by the condensation of carboxylic acids with a di-, or polyamine; partially amidated polyalkylenimines and acidic solutions thereof; and long chain alkyl amines, long chain alkyl amides, amidated alkyl amines, polyamino alkyl amides, partially amidated polyalkylene amides.

* * * * *